United States Patent
McCord

(10) Patent No.: US 9,587,990 B2
(45) Date of Patent: Mar. 7, 2017

(54) MOUNTING ARRANGEMENT FOR A TEMPERATURE SENSOR IN AN ELECTRIC MACHINE

(71) Applicant: Remy Technologies LLC, Pendleton, IN (US)

(72) Inventor: Michael McCord, Anderson, IN (US)

(73) Assignee: Remy Technologies LLC, Pendleton, IN (US)

( * ) Notice: Subject to any disclaimer, the term of this patent is extended or adjusted under 35 U.S.C. 154(b) by 477 days.

(21) Appl. No.: 14/289,637

(22) Filed: May 28, 2014

(65) Prior Publication Data

US 2015/0346036 A1    Dec. 3, 2015

(51) Int. Cl.
| | |
|---|---|
| *H02K 11/00* | (2016.01) |
| *H02K 5/02* | (2006.01) |
| *G01K 1/14* | (2006.01) |
| *F16M 13/02* | (2006.01) |
| *G01K 7/00* | (2006.01) |

(52) U.S. Cl.
CPC ............... *G01K 1/14* (2013.01); *F16M 13/02* (2013.01); *G01K 7/00* (2013.01); *G01K 2205/00* (2013.01)

(58) Field of Classification Search
CPC ................................ H02K 11/00; G01K 1/14
USPC .... 310/68 B, 68 C, 68 R; 165/185; 361/807; 374/208
See application file for complete search history.

(56) References Cited

U.S. PATENT DOCUMENTS

| | | | | | |
|---|---|---|---|---|---|
| 3,215,873 | A | * | 11/1965 | Kruger | H02K 11/25 200/295 |
| 5,011,101 | A | * | 4/1991 | Buchser | F25D 21/08 248/231.81 |
| 5,194,717 | A | * | 3/1993 | Cowen | F04C 29/04 219/201 |
| 5,563,570 | A | * | 10/1996 | Lee | H01C 1/084 310/68 C |
| 2010/0067562 | A1 | * | 3/2010 | Wakabayashi | G01K 1/14 374/208 |

* cited by examiner

*Primary Examiner* — Jose Gonzalez Quinones
(74) *Attorney, Agent, or Firm* — Maginot, Moore & Beck LLP

(57) ABSTRACT

An arrangement for sensing temperature in an electric machine comprises a plate member including a first side, a second side, a perimeter portion, and at least one hole extending through the plate member from the first side to the second side. A mount is coupled to the plate member. The mount includes a retention surface, at least one first arm, and at least one second arm. The retention surface is removed from the first side of the plate member. The at least one first arm extends from the retention surface and engages the perimeter portion of the plate member. The at least one second arm extends from the retention surface and through the at least one hole of the plate member. A temperature sensor is positioned between the first side of the plate member and the retention surface of the mount.

18 Claims, 4 Drawing Sheets

US 9,587,990 B2

MOUNTING ARRANGEMENT FOR A TEMPERATURE SENSOR IN AN ELECTRIC MACHINE

FIELD

This document relates to the field of electrical machines, and particularly to devices for mounting a thermal sensor or other temperature sensor on an electric machine.

BACKGROUND

Temperature sensors are commonly mounted at various locations in automobiles and other vehicles to monitor operating conditions within the vehicle. A high temperature can indicate that a particular component is not working properly or is about to fail.

One common location for a temperature sensor in a vehicle is connected or adjacent to a starter motor or other vehicle electric machine. For example, a temperature sensor in the form of a thermal switch, also known as a thermal cutoff or thermal link, may be positioned in the circuit that delivers power to the starter motor. When the thermal switch is heated to a predetermined temperature, the thermal switch interrupts electrical current to the starter motor.

Thermal switches may be mounted in any of various locations near the starter motor housing. One common mounting location is on the brush plate for the starter motor. An exemplary prior art mount for a thermal switch on a starter motor base plate is shown in FIG. 5. The mount includes a metallic mounting bracket 210 that is fastened to a base plate 200 of the starter motor, which may be, for example, the brush holder plate. The mounting bracket 210 includes a central plate portion that provides a retention surface 212, two sidewalls 214 extending from the retention surface 212, and two ears 216 extending outward from the sidewalls 214, parallel with the retention surface 212. Each ear includes an opening 218 that is aligned with a hole extending through the base plate 200. Fasteners 220, such as rivets or bolts, extend through the openings 218 and the holes in the base plate 200 to secure the mounting bracket 210 to the base plate 200. A thermal switch 202 is positioned between the base plate 200 and the retention surface 212 of the mounting bracket. The thermal switch 202 includes leads 204 that extend outward past an outer perimeter of the base plate. One lead is welded to the base plate 200. The other lead is connected to a coupler 206 that leads to an external magnetic switch (not shown).

While the arrangement of FIG. 5 is adequate for mounting a thermal switch to a brush holder plate, various aspects of the arrangement could be improved upon. For example, in the arrangement of FIG. 5 a relatively large area is required on the base plate for the mounting members, including the ears 216 and the fasteners 220. Additionally, the arrangement of FIG. 5 generally limits the options for orienting the sensor on the base plate.

In view of the foregoing, it would be advantageous to improve upon the mounting arrangement. For example, it would be advantageous for such mounting arrangement to be provided using fewer components and less expensive components. It would also be advantageous if such mounting arrangement could be provided using less space on the base plate. Moreover, it would be advantageous to provide a mounting arrangement that provides the manufacturer with the ability to orient the thermal sensor in a way such that wires from the sensor are contained within the confines of the base plate and without protruding outside of the inner diameter or outer diameter of the base plate. Additionally, it would be advantageous if assembly of the mounting arrangement could be simplified, requiring fewer assembly steps, thus simplifying the manufacturing process and saving on manufacturing costs.

SUMMARY

In accordance with one exemplary embodiment of the disclosure, there is provided a mount configured for connection to a base plate of an electrical machine. The base plate includes a first side, a second side, an outer perimeter portion, and at least one hole extending from the first side to the second side. The mount is configured to retain a temperature sensor on the base plate. The mount comprises a retention surface configured to engage a first side of the temperature sensor and retain the temperature sensor between the retention surface and the first side of the base plate. At least one first arm extends away from the retention surface and is configured to extend from the first side to the second side of the base plate adjacent to the outer perimeter portion of the base plate. At least one second arm extends away from the retention surface and is configured to extend from the first side to the second side of the base plate through the at least one hole of the base plate.

Pursuant to another exemplary embodiment of the disclosure, there is provided an arrangement for sensing temperature in an electric machine. The arrangement comprises a plate member including a first side, a second side, a perimeter portion, and at least one hole extending through the plate member from the first side to the second side. A mount is coupled to the plate member. The mount includes a retention surface, at least one first arm, and at least one second arm. The retention surface is removed from the first side of the plate member. The at least one first arm extends from the retention surface and engages the perimeter portion of the plate member. The at least one second arm extends from the retention surface and through the at least one hole of the plate member. A temperature sensor is positioned between the first side of the plate member and the retention surface of the mount.

In accordance with yet another exemplary embodiment of the disclosure, there is provided a method of mounting a temperature sensor to a base plate. The method comprises positioning the temperature sensor on the base plate or a mount and then positioning the mount next to the base plate with opposing arms of the mount near the holes in the base plate. The method further comprises deflecting the opposing arms of the mount with a force on the arms such that the opposing arms are moved into alignment with the holes in the base plate. Additionally, the method comprises inserting the opposing arms of the mount into the holes in the base plate and then removing the force from the opposing arms of the base plate such that the opposing arms engage the base plate.

The above described features and advantages, as well as others, will become more readily apparent to those of ordinary skill in the art by reference to the following detailed description and accompanying drawings. While it would be desirable to provide a mounting arrangement for a temperature sensor in an electric machine that provides one or more of these or other advantageous features, the teachings disclosed herein extend to those embodiments which fall within the scope of the appended claims, regardless of whether they accomplish one or more of the above-mentioned advantages.

DESCRIPTION

Figure 1:
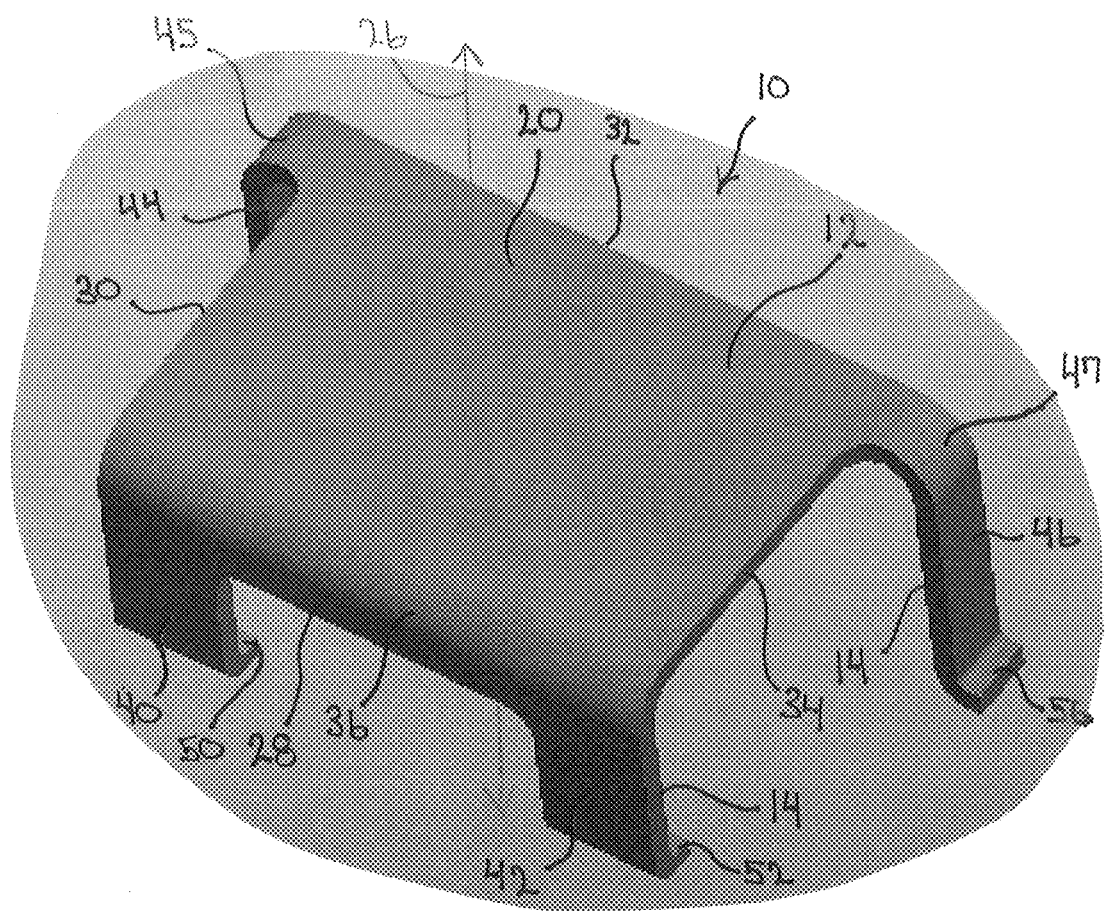
FIG. 1 shows a perspective view of a mount for a temperature sensor in an electric machine.
Figure 2:
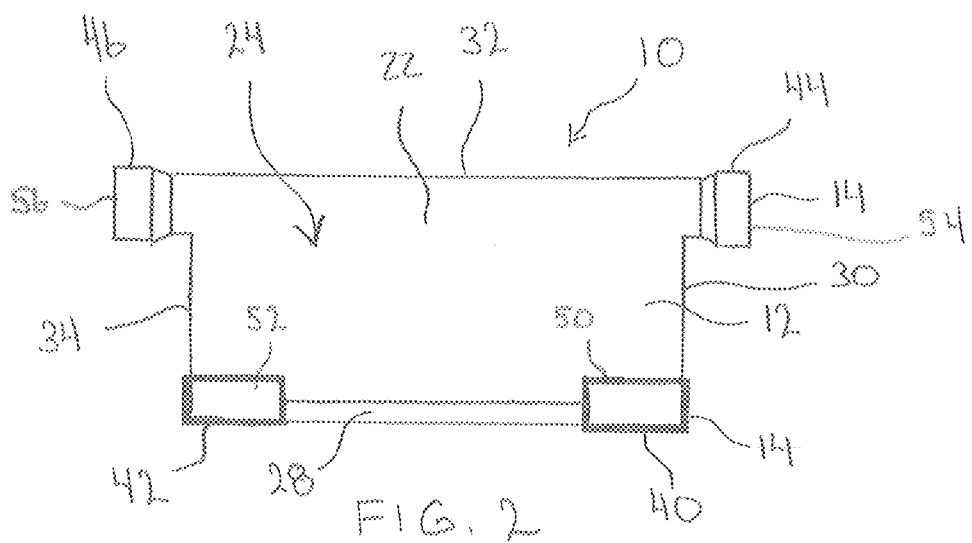
FIG. 2 shows a lower-side view of the mount of FIG. 1.

With reference to FIGS. 1 and 2, an exemplary embodiment of a mount 10 configured for connection to a base plate 100 of an electrical machine is shown. The mount 10 is provided by a bracket member that generally includes a central plate portion 12 with arms 14 extending from the central plate portion 12. Two of the arms 14 are configured to engage holes in the base plate 100 and two of the arms 14 are configured to extend along a perimeter portion of the base plate.

The mount 10 is a unitary component and is comprised of a resilient material, such as a spring steel material. Accordingly, the mount 10 may be formed by any of various methods, such as molding, stamping, or any of various other methods that will be recognized by those of ordinary skill in the art. Because the mount 10 is a unitary component, it is a single piece part, and does not include multiple components that may be non-destructively separated from one another.

In the embodiment of FIGS. 1 and 2, the central plate portion 12 is generally flat and rectangular in shape with a relatively smooth surface on a first side 20 and an opposing second side 22 of the plate member 12. The perimeter of the plate member 12 includes three relatively sharp edges 30, 32, 34, and one relatively rounded/curved edge 36. A retention surface 24 is provided on the second side 22 of the plate member 12. As explained in further detail below, this retention surface 24 is configured to engage a thermal sensor.

The arms 14 include four different arms 40, 42, 44 and 46 that extend outwardly from the plate member 12 at the edges of the plate member 12. Parallel arms 40 and 42 are positioned adjacent to the curved edge 36, and extend outward from the curved edge 36 in a downward direction (i.e., a direction that extends away from the second side 22 of the plate member 12 and is substantially parallel to a center axis 26 extending perpendicular to the retention surface 24). A bridge 28 extends between the parallel arms 40 and 42, along a downward side of the curved edge 36. The bridge 28 only extends in the downward direction for a relatively short distance, as most of the length of the arms 40 and 42 are not connected by the bridge 28. The bridge 28 is generally the same thickness as the plate member 12.

Opposing arms 44 and 46 are positioned adjacent to the edges 30 and 34, respectively, and extend outward from the edges 30 and 34 primarily in the downward direction. Opposing arms 44 and 46 include curved elbow portions 45 and 47 near the edges 30 and 34. The curved elbow portions 45 and 47 provide a transition in the arms 44 and 46 from an initial orientation/direction that is substantially perpendicular to the center axis 26 to a primary orientation/direction that is substantially parallel to the center axis (i.e., arms 44 and 46 primarily extend away from the plate member 12 in the downward direction).

Each of arms 40, 42, 44 and 46 include a lip on an end or tip portion of the arm. Parallel arms 40 and 42 include lips 50 and 52, respectively. Lips 50 and 52 extend in an inward direction (i.e., a direction substantially perpendicular to the center axis 26 and closer to the plate member 12). Opposing arms 44 and 46 include lips 54 and 56, respectively. Lips 54 and 56 extend in an outward direction (i.e., a direction generally perpendicular to the center axis 26 and farther from the plate member 12).

The arms 14 are all resilient such that deflection of the arms in one direction will result in a force in the opposite direction. In other words, when deflected, the arms are biased back toward their original position. This is due to the material composition of the arms (e.g., spring steel), as well as the cantilever arrangement of the arms 14 extending outwardly from the plate member 12. Also, the curves associated with the arms 14, including the elbow portions 45 and 47, and the curved edge 36, facilitate deflection of the arms 14 along the curved portions associated with the arms.

Figure 3:
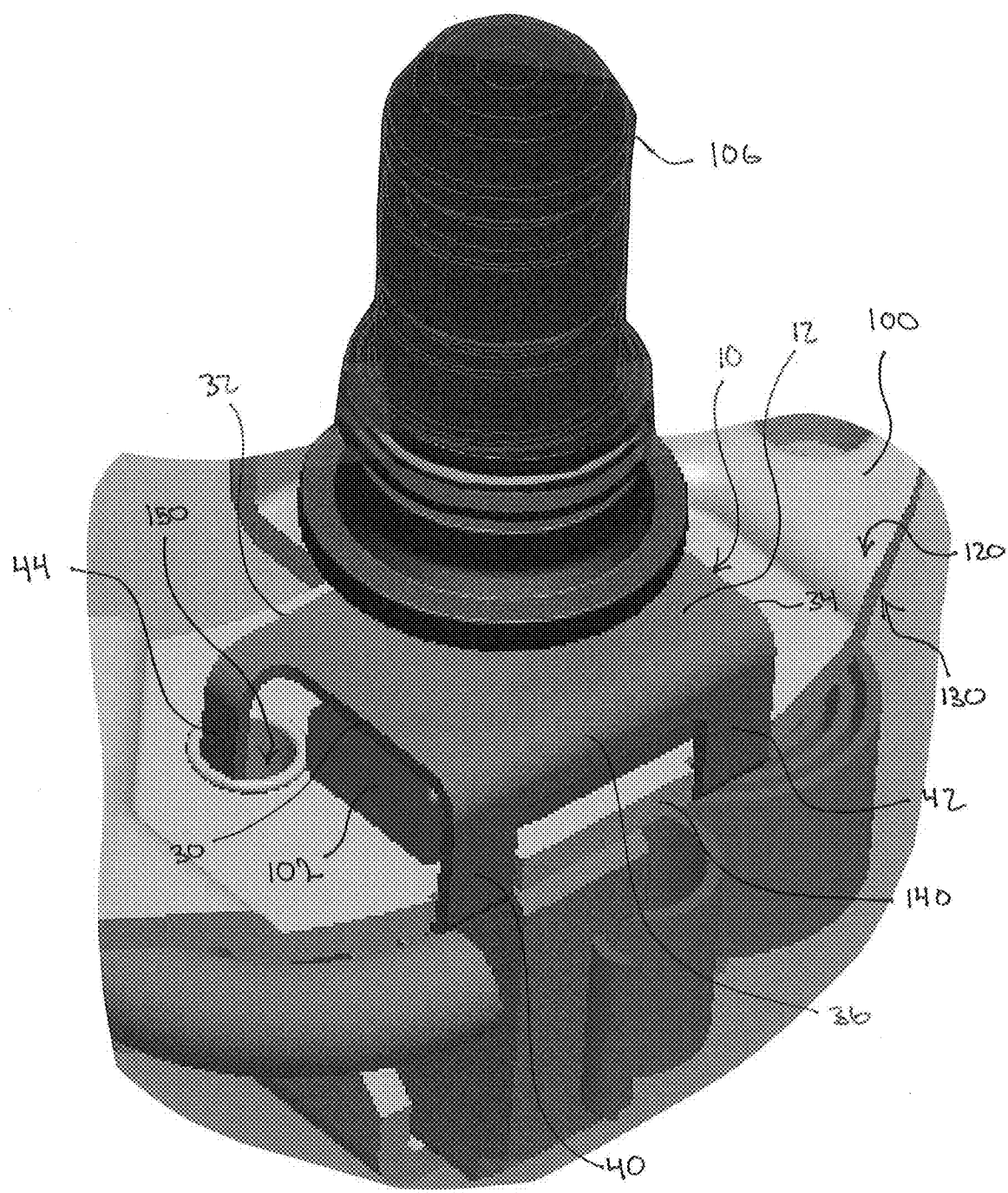
FIG. 3 shows a perspective view of the mount of FIG. 1 coupled to a brush holder plate such that a temperature sensor is retained thereon.
Figure 5:
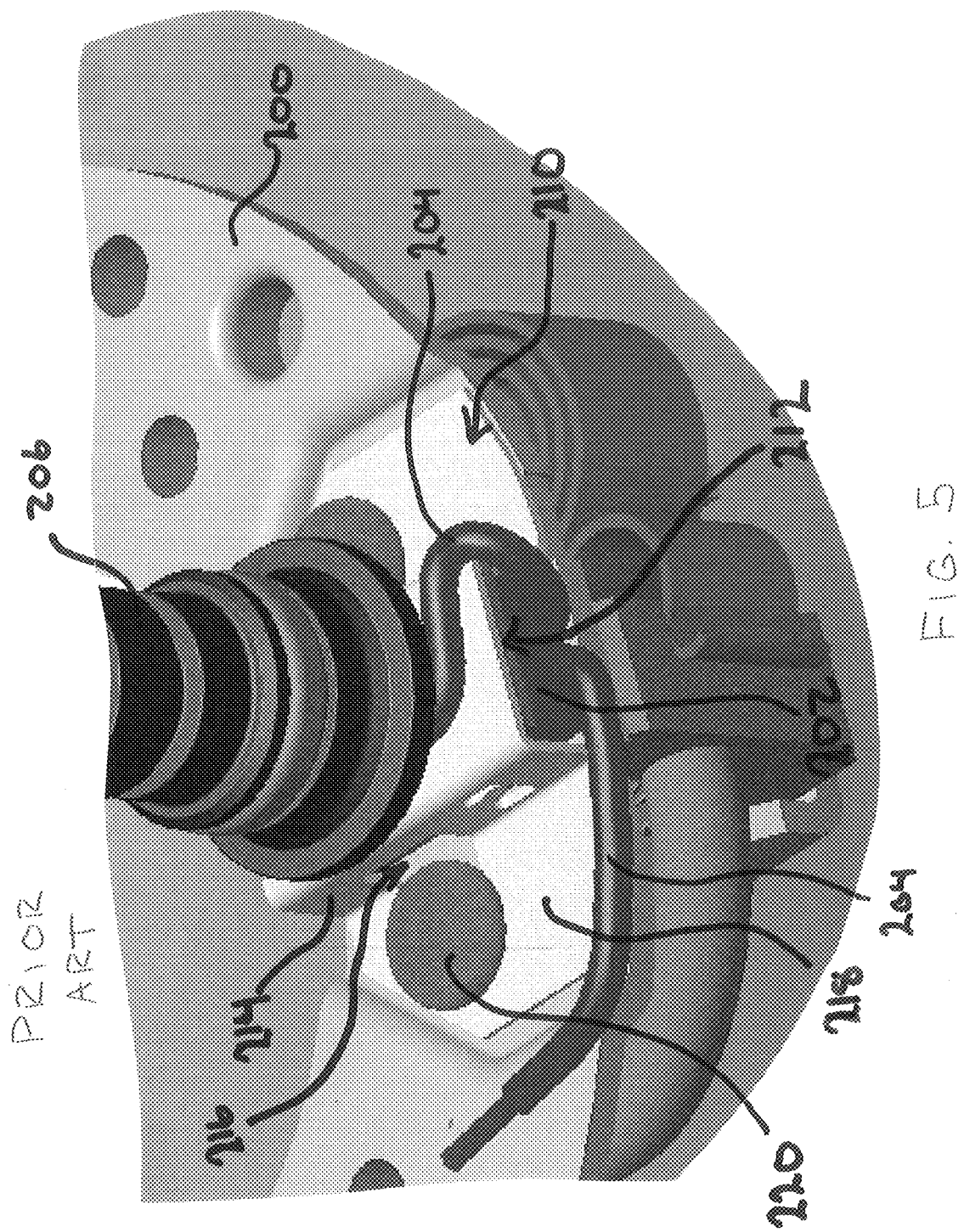
FIG. 5 shows an exemplary prior art mounting arrangement for a thermal switch on a starter motor base plate.

With reference now to FIG. 3, an arrangement for sensing temperature in an electric machine using the mount 10 of FIGS. 1 and 2 is shown. The mount 10 is positioned on a base plate 100, and particularly a brush holder plate for an electric machine. The base plate 100 includes a first side 120, a second side 130, an outer perimeter portion 140, and at least one hole 150 extending through the base plate 100 from the first side 120 to the second side 130. The at least one hole 150 may be, for example, a hole configured to receive a fastener such as that associated with the mounting bracket 110 of FIG. 5. While a brush holder plate has been disclosed herein as an example of a device on which the mount 10 is positioned, it will be recognized by those of ordinary skill in the art that the mount may alternatively be provided on any number of different types of base plates or other mounting surfaces.

The mount 10 is coupled to the base plate 100. The retention surface 24 of the mount 10 is removed from the first side 120 of the base plate 100, and a temperature sensor 102 is positioned between the retention surface 24 and the first side 120 of the base plate 100. The temperature sensor Arms 40 and 42 of the mount 10 extend from the retention surface 24 and engage the outer perimeter portion 140 of the base plate 100. In the embodiment of FIG. 3, the arms 40 and 42 extend from the first side 120 to the second side 130 of the base plate 100 adjacent to the outer perimeter portion 140 of the base plate 100. The lips 50 and 52 on the arms 40 and 42 hook under the base plate 100 and engage the lower surface on the second side 130 of the base plate 100.

Arms 44 and 46 of the mount 10 extend from the retention surface 24 and engage the holes 150 in the base plate 100. In the embodiment of FIG. 3, the arms 44 and 46 extend from the first side 120 to the second side 130 of the base plate 100 by passing through the holes 150 in the base plate. The lips 54 and 56 on the arms 44 and 46 hook under the base plate 100 and engage the lower surface on the second side 130 of the base plate 100.

Arms 40 and 42 are slightly deflected in an outward direction when the mount 10 is positioned on the base plate 100. Accordingly, arms 40 and 42 provide a force against the outer perimeter portion 140 of the base plate 100, urging the mount 10 in the outward direction. Similarly, arms 44 and 46 are slightly deflected in an inward direction when the mount is positioned on the base plate. Accordingly, arms 44 and 46 provide a force against the outer perimeter of the holes 150 in the base plate. Because the arms 44 and 46 are positioned on opposite sides of the central plate portion 12, these forces oppose one another, and act to stabilize the mount 10 upon the base plate 100. Additionally, the arms 44 and 46 are trapped in the holes 150, and thus resist the outward force on the mount 10 from the arms 40 and 42.

In order to secure the temperature sensor 102 to the base plate 100, the manufacturer first places the temperature sensor on the base plate 100 in a desired orientation between two of the holes 150 in the base plate 100. Alternatively, the temperature sensor may first be connected to the mount 10 by engaging the temperature sensor 102 with the retention surface 24 on the underside of the central plate portion 12 of the mount 10. An adhesive layer 103 may be used to attach one side of the temperature sensor 102 to the mount 10, resulting in an indirect engagement between the retention surface 24 and the temperature sensor 102. The adhesive layer 103 may be provided by any of various means, such as a two-sided adhesive tape, glue, epoxy or other adhesive material.

With the temperature sensor 102 in place, the manufacturer hooks the parallel arms 40 and 42 of the mount 10 around the outer perimeter portion 140 of the base plate 100 while aligning the opposing arms 44 and 46 slightly outside of the holes 150 in the base plate. The opposing arms 44 and 46 are then deflected toward one another in an inward direction. This may be accomplished by a human hand, tool or machinery. With the opposing arms 44 and 46 forced slightly inward, the arms 44 and 46 are then aligned with the holes 150 in the base plate and inserted into the holes 150 from the first side 120 to the second side 130 of the base plate 100. When the arms 44 and 46 are fully inserted into the holes 150, such that the lips 54 and 56 on the ends of the arms 44 and 46 are positioned at the second side 130 of the base plate 100, the manufacturer releases the inward force on the arms 44 and 46. This allows the arms 44 and 46 to spring outward and engage the lining of the holes 150 in the base plate 100. As a result, the lips 54 and 56 are hooked under the base plate 100. The spring forces from the arms 40, 42, 44 and 46 of the base plate 100 act to secure the mount 10 on the base plate 100. In particular, the parallel arms 40 and 42 engage the outer perimeter portion 140 of the base plate 100 with the lips 50 and 52 hooked under the base plate 100. At the same time the arms 44 and 46 engage the base plate via the holes 150 with the lips 54 and 56 hooked under the base plate 100.

Figure 4:
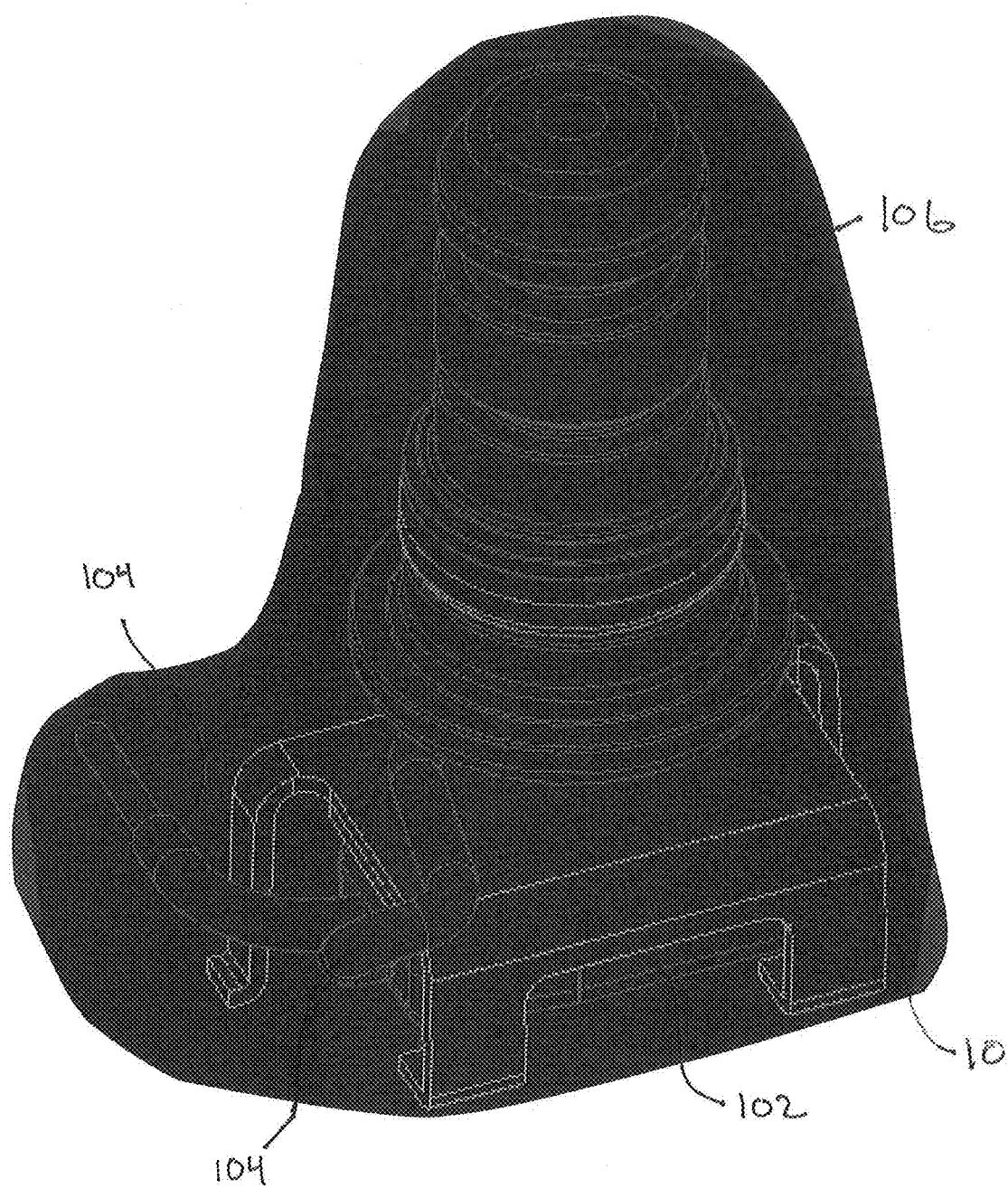
FIG. 4 shows a perspective view of the mount of FIG. 2 including the temperature sensor and a power coupling, with the mount isolated from the base plate.

FIG. 4 is similar to FIG. 3, but in FIG. 4 the base plate 100 is removed to show the entire mount 10 with the temperature sensor 102 attached thereto. FIG. 4 also shows the leads 104 of the temperature sensor connected to a coupler 106, which provides an electrical connection to the starter motor.

As described above, the configuration of the mount 10 allows a temperature sensor, such as a thermal switch to be connected to an existing base plate in an electric machine using a bracket comprised of a spring steel or other resilient material. No additional fasteners such as rivets, threaded bolts, or other fasteners are required to connect the mount 10 to the base plate 100. Furthermore, the mount 10 allows the temperature sensor 102 to be oriented in any of various directions such that the temperature sensor 102 may be rotated by a full 180° between one mounting position and another, as desired by the manufacturer. Accordingly, the mount 100 allows the leads 104 of the temperature sensor 102 to extend out from under any of the edges 30, 32, 34 or 36 such that the leads 104 may be easily and conveniently directed to the proper location with minimal intrusion into the surrounding space. This allows the mounting arrangement to accommodate a tight space within the electric machine. Additionally, the spring steel or other resilient material used to make the bracket allows the mount to firmly secure the temperature sensor on the base plate.

The foregoing detailed description of one or more exemplary embodiments of the mounting arrangement for a temperature sensor in an electric machine has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed exemplary embodiments and other features and functions, or alternatives thereof, may be desirably combined into many other different embodiments, systems or applications. For example, while the temperature sensor is disclosed herein as being a thermal switch in various exemplary embodiments, it will be recognized by those of ordinary skill in the art that the temperature sensor may be provided by any of various temperature sensing devices which may or may not be accompanied by processors, controllers or other electronic devices. Furthermore, presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the exemplary embodiments contained herein.

What is claimed is:

1. A mount configured for connection to a base plate of an electrical machine, the base plate including a first side, a second side, an outer perimeter portion, and at least one hole extending from the first side to the second side, the mount configured to retain a temperature sensor on the base plate, the mount comprising:
    a retention surface configured to engage a first side of the temperature sensor and secure the temperature sensor between the retention surface and the first side of the base plate;
    at least one first arm extending away from the retention surface, the at least one first arm configured to extend from the first side to the second side of the base plate adjacent to the outer perimeter portion of the base plate; and
    at least one second arm extending away from the retention surface, the at least one second arm configured to extend from the first side to the second side of the base plate through the at least one hole of the base plate.

2. The mount of claim 1, wherein the at least one second arm is a resilient spring arm such that deflection of the at least one second arm in an inward direction results in a force provided by the at least one second arm in an outward direction.

3. The mount of claim 2 further comprising a lip on the at least one second arm that is configured to engage the second side of the base plate.

4. The mount of claim 2 further comprising a lip on a tip portion of the at least one second arm, the lip extending in the outward direction from the at least one second spring arm.

5. The mount of claim 1 further comprising a lip that extends from the at least one first arm in an inward direction and engages the second side of the base plate.

6. The mount of claim 5 wherein the lip is provided on a tip portion of the at least one first arm.

7. The mount of claim 1 wherein the at least one first arm includes two first arms extending from a first side of the retention surface, and the at least one second arm includes two second arms extending from a second side and a third side of the retention surface, the second side opposing the third side of the retention surface.

8. The mount of claim 1 wherein the temperature sensor is a thermal switch.

9. The mount of claim 1 where the base plate is a brush holder plate.

10. An arrangement for sensing temperature in an electric machine, the arrangement comprising:
a plate member including a first side, a second side, a perimeter portion, and at least one hole extending through the plate member from the first side to the second side;
a mount coupled to the plate member, the mount including a retention surface, at least one first arm, and at least one second arm, the retention surface removed from the first side of the plate member, the at least one first arm extending from the retention surface and engaging the perimeter portion of the plate member, the at least one second arm extending from the retention surface and extending through the at least one hole of the plate member; and
a temperature sensor positioned between the first side of the plate member and the retention surface of the mount.

11. The arrangement of claim 8 wherein the at least one second arm is a resilient spring arm such that deflection of the at least one second arm in one direction results in a force provided by the at least one second arm in an opposite direction.

12. The arrangement of claim 9 further comprising a lip on the at least one second arm, the lip engaging the second side of the plate member.

13. The arrangement of claim 9 further comprising a lip on a tip portion of the at least one second arm, the lip engaging the second side of the plate member.

14. The arrangement of claim 8 further comprising a lip extending from the at least one first arm and engaging the second side of the plate member.

15. The arrangement of claim 12 wherein the lip is provided on a tip portion of the at least one first arm.

16. The arrangement of claim 8 wherein the at least one first arm includes two first arms extending from a first side of the retention surface, and the at least one second arm includes two second arms, one second arm extending from a second side of the retention surface and another of the second arms extending from a third side of the retention surface, the second side opposing the third side of the retention surface.

17. The arrangement of claim 8 wherein the plate member is a brush holder plate.

18. The arrangement of claim 8 wherein the temperature sensor is a thermal switch.

* * * * *